April 20, 1965 R. F. DUDAS 3,179,551
SURFACE-COVERING CUSHION AND METHOD FOR MAKING THE SAME
Filed June 1, 1960 2 Sheets-Sheet 1
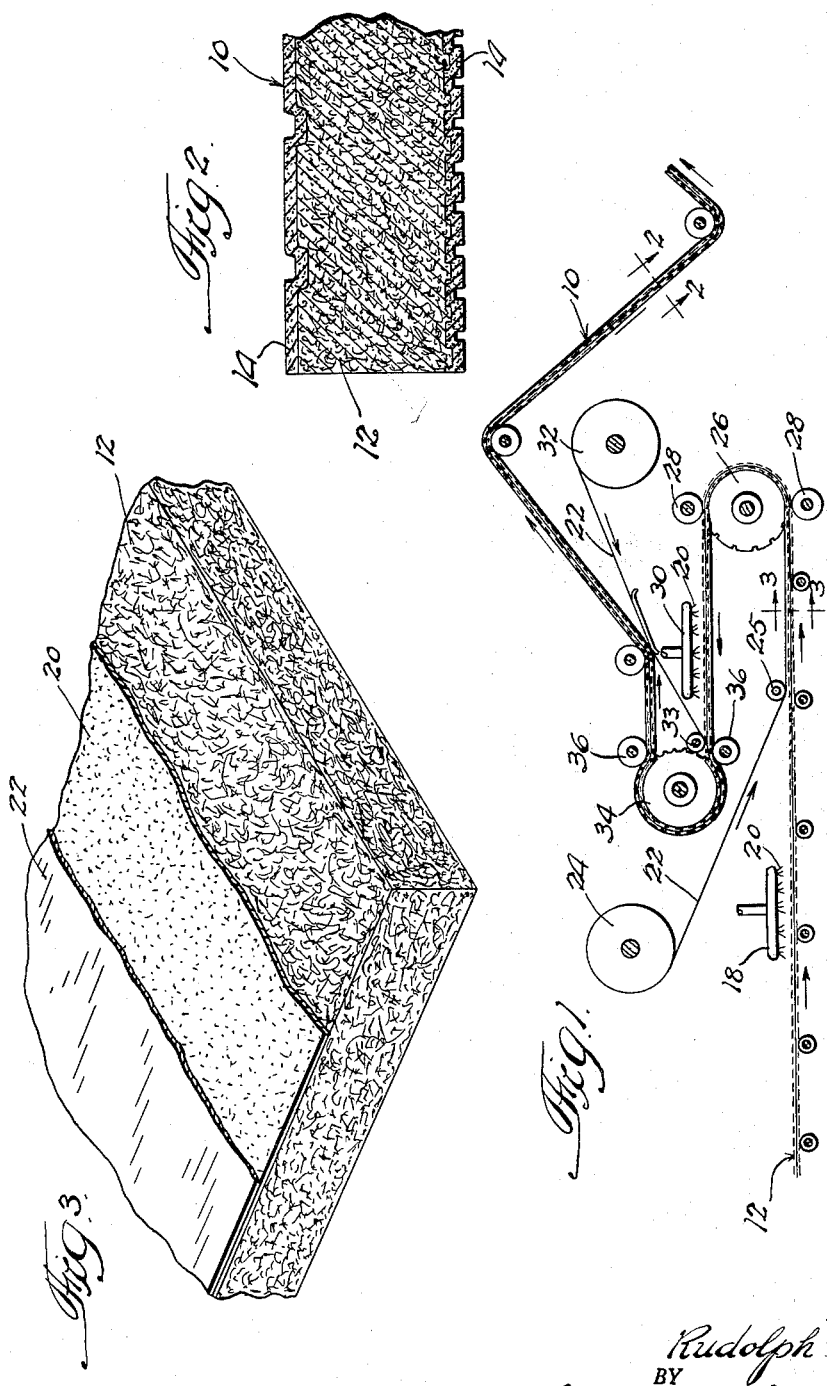
INVENTOR.
Rudolph F. Dudas
BY
Olsen, Mecklenburger, van Holst,
Pendleton & Neuman. Attys.

April 20, 1965  R. F. DUDAS  3,179,551
SURFACE-COVERING CUSHION AND METHOD FOR MAKING THE SAME
Filed June 1, 1960  2 Sheets-Sheet 2
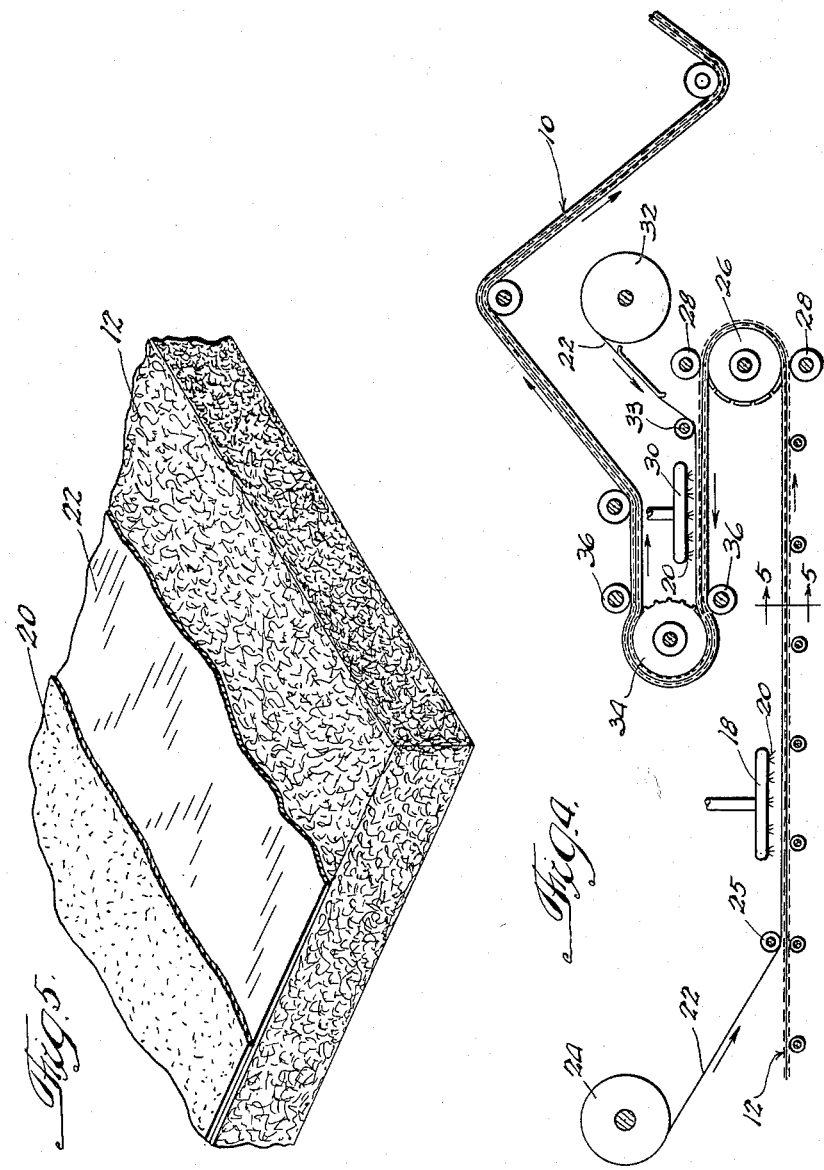

3,179,551
SURFACE-COVERING CUSHION AND METHOD
FOR MAKING THE SAME
Rudolph F. Dudas, Downers Grove, Ill., assignor, by mesne assignments, to General Felt Industries, Inc., Chicago, Ill., a corporation of Illinois
Filed June 1, 1960, Ser. No. 33,241
12 Claims. (Cl. 161—116)

This invention relates generally to coated surface-covering cushions and more particularly to a smooth-surfaced rug or carpet underlay, the surface thereof comprising an initially porous sheet impregnated with a rubbery elastomeric composition. The invention further relates to a method for making the aforesaid structure.

Various coated surface-covering cushions have been heretofore proposed for use as underlays for rugs and carpets. Generally, they have comprised bases of woven fibrous material having their planar surfaces covered and impregnated with a rubber composition of the rubber latex or rubber dispersion class. These cushions have been produced by a continuous process which, in most instances, includes the steps of applying the rubber composition to the surfaces of the cushion, drying such composition, and running the coated surfaces of the cushions over embossing drums to impress predetermined designs thereon. The rubber composition imparts a variety of desirable qualities to the cushion, such as resiliency, durability, and the ability to retain initial dimensions even after continuous use over a long period of time. But the rubber coating also creates an unattractive product, because the fibers comprising the base of the cushion tend to shed and break through the cushion surface, giving it a rough and imperfect appearance. Unsightliness, however, is not the only disadvantage of these cushions.

In order to prevent a carpet from wrinkling when it is laid, it is necessary to considerably stretch the carpet before securing it by tacks or nails to the underlay and floor covered thereby. The rough, imperfect surfaces of the rubber-coated underlays prevent the overlying carpet from easily sliding when in contact therewith and necessitates the exertion of an excessive amount of pull on the carpet in order to lay it in a tightly stretched fashion. Consequently, carpet laying utilizing the surface-covering cushions of the prior art is a difficult, time-consuming and expensive task.

Accordingly, it is one object of this invention to provide a more attractive surface-covering cushion having smooth and uniform surfaces over which carpet may be more easily stretched and laid.

It is a further object of this invention to provide a stronger surface-covering cushion which will resist normal deterioration and, when stretched, will not tear as easily as those heretofore known.

It is a still further object of this invention to provide a surface-covering cushion which has great commercial acceptability and marketability and is simple, expedient, and inexpensive to produce.

Another object of this invention is to provide a more rapid and improved method for producing surface-covering cushions which avoids the difficulties besetting the processes formerly employed.

Further and additional objects will appear from the description, accompanying drawings and appended claims.

In accordance with one embodiment of this invention, a surface-covering cushion is provided which is formed from a base of fibrous material having the fibers thereof garnetted and needled together to form a flat web of predetermined thickness, width and density. The planar surfaces of the web are covered by an impregnated initially porous sheet comprising a thin paper or the like and a rubbery elastomeric impregnant. The two materials comprising the aforesaid coating are not separately identifiable in the finished structure, and the elastomeric material used therein is so distributed throughout the sheet material as to give the cushion surfaces the appearance and feeling of rubber. These surfaces, however, unlike those rubber surfaces of the past, are smooth and uniform.

The cushion may be manufactured by brushing or spraying the elastomeric composition on the planar surfaces of the fibrous web, laying a continuous sheet of porous material over the elastomer coating on the surface of the web and applying pressure to the surface to effect unification of the two materials and form a single impregnated layer. If desired, the porous material may be applied prior to the application of the elastomeric composition without creating any substantial variation in the final product. The pressure necessary to merge the elastomer and porous material into a single layer may be applied by embossing drums, if it is deemed desirable to impress designs on the cushion surfaces.

It has been found that the surface-covering cushion of this invention substantially obviates the hitherto-noted disadvantages of the rubber-coated cushions of the prior art. The porous material greatly reduces the tendency of the base fibers to break through the cushion surfaces, thus eliminating the surface imperfections present in the cushions heretofore known, and imparting to the cushion uniform, smooth, and more attractive surfaces. These smooth surfaces, besides lending a more pleasing appearance to the finished product, simplify carpet laying by permitting the overlying carpet to be slid over the underlay with a minimum of resistance, whereby the carpet is more easily stretched.

For a more complete understanding of this invention reference should be made to the drawings wherein:

FIGURE 1 is a diagrammatic view of one embodiment of the improved method of this invention;

FIG. 2 is an enlarged sectional view taken along line 2—2 of FIG. 1 which shows one embodiment of the structure of this invention;

FIG. 3 is an enlarged fragmentary perspective view taken at line 3—3 of FIG. 1;

FIG. 4 is a diagrammatic view of another embodiment of the improved method of this invention; and FIG. 5 is an enlarged fragmentary perspective view taken at line 5—5 of FIG. 4.

Referring now to the drawings and, more particularly, to FIG. 2, an improved surface-covering cushion 10 is shown. The cushion 10 consists primarily of a web 12, which is of predetermined thickness, width, and density and is formed of fibers garnetted and needled together. The fibrous material used in the formation of the web 12 may be composed of any hair or natural fibers commonly used for surface-covering cushions, such as jute, hemp, sisal, wool, or the like, any synthetic fibers capable of producing a suitable cushion, or any suitable blend of the aforesaid fibers. Affixed to a surface of the web 12 is a layer 14 consisting of an impregnated initially porous sheet, in which the impregnant is a rubber elastomeric composition. Layer 14 may be formed and united with web 12 by applying the elastomeric composition and the porous sheet to a surface of web 12 and applying pressure to such surface. In the disclosed method of manufacture the pressure is applied by embossing drums which impress predetermined designs on the cushion surfaces. The elastomer may be applied either prior or subsequent to the application of the porous material. FIG. 3, in showing one surface of web 12 as it appears during the process shown in FIG. 1, after the elastomer and the porous sheet have been applied thereto but prior to the embossment thereof, illustrates the appearance of the cushion surface before the two materials merge into the single layer 14. Similar to FIG. 3 is FIG. 5, except that the latter shows the unembossed web 12 having the porous material applied thereto prior to the application of the elastomeric composition, in accordance with the modification of the process of this invention shown in FIG. 4. The elastomeric composition used to form layer 14 is preferably any suitable sealing compound of the rubber latex or rubber dispersion class and may include either natural or synthetic rubber to which accelerators, age retarders, vulcanizing agents, and other basic ingredients, fillers, pigments and the like may have been added. The elastomer, however, need not be rubber, but may include any suitable plastic materials having those rubber-like properties desirable in a surface-covering cushion, such as resiliency and durability. The proportions of the rubbery elastomer preferably used in the cushion of this invention range from about 1.5 to about 4 ounces per square yard of web surface, and about 2 ounces of elastomer per square yard of web surface affords a commercially satisfactory cushion. The porous material used in the formation of layer 14 is preferably a porous paper known in the art as "industrial wadding," but any suitable porous paper or other porous material may be employed.

Referring now to FIG. 1, one embodiment of the improved method of this invention is diagrammatically shown. The web 12 is initially fed past a sprayer 18 which applies an elastomeric composition 20 to a planar surface of the web 12 while the latter is moving at a predetermined rate of speed. Instead of sprayer 18 a brush applicator may be used. By regulating the speed of the web 12 only the fibers adjacent the surface thereof become impregnated with composition 20; the fibers forming the central layer of the web 12 remain unaffected. When a rubber composition is used as the elastomer, it has been found that quantities ranging from about three to about eight ounces of wet rubber composition per square yard of web surface are preferable and that about four ounces of web rubber per square yard of web surface will produce a commercially suitable cushion. By "wet rubber" it is meant a liquid rubber composition containing fifty percent by weight solids. Consequently, the dry weight of such wet rubber composition will be one-half of its wet weight. Subsequent to the application of the elastomer coating, a porous material 22, supplied in a continuous sheet from a storage spool 24, is laid by roller means 25 upon the composition 20 which coats the surface of web 12. The web 12, with the porous sheet 22 disposed on the surface thereof, then passes over an embossing drum 26 by means of rollers 28 where a predetermined design is impressed on the coated surface of the web. To effect setting of the embossments formed in the coated web surface, the temperature of the embossing drum 26 may be varied from 200° F. to 500° F., depending upon the characteristics of the base material and the elastomeric composition applied thereto. The embossment of the web surface causes the elastomeric composition and the porous sheet to merge into a single layer 14 and firmly unites the impregnated sheet 14 with the 12.

After web 12 passes over embossing drum 26, the opposite surface thereof travels under sprayer 30, which is the same or similar to sprayer 18. Here, also, the sprayer may be replaced by a brush applicator. Sprayer 30 applies the elastomeric composition 20 to the opposite or uncoated surface of the web 12 in amounts equivalent to those utilized on the first surface of the web, and subsequent to this application the porous sheet 22, supplied by storage spool 32, is immediately laid upon the freshly coated surface by roller means 33. As was the case with respect to the first surface, the second surface now passes over an embossing drum 34 through a second set of rollers 36 and is impressed with a predetermined design. The temperature range in embossing drum 34 is dependent upon the same considerations which concern drum 26. Having been embossed on its second side, web 12 continues its travel until it reaches a cutting machine or is wound about a storage spool, neither of which is shown in FIG. 1. During its travel after leaving the second embossing drum 34, web 12 will undergo self-drying; however, to expedite such drying, the finished cushion may be passed through a dryer, not shown in the drawings.

Referring to FIG. 4, the process of this invention is shown in a modified form. In this method the porous sheet 22 is applied prior to the application of the rubbery elastomeric composition 20. The method includes laying the porous sheet 22, supplied by storage spool 24, on the uncoated web 12, spraying the elastomeric composition 20 over the sheet 22 by means of sprayer 18, and passing the coated web surface over embossing drum 26, which impresses a predetermined design on the web surface and causes the elastomer and porous sheet to form a single layer 14 (FIG. 2). The remainder of the method continues in a manner similar to the process shown in FIG. 1, with the exception that storage spool 32 supplies porous material 22 to the uncoated web surface prior to the application of the elastomeric composition 20, which is sprayed over the porous sheet by sprayer 30. The amounts of elastomeric composition used in this modification will be substantially the same as those amounts used in the process illustrated in FIG. 1. Although not specifically illustrated, it will be understood that one surface of web 12 can be coated in accordance with the method of FIG. 1 and the other surface in accordance with the method of FIG. 4.

Thus, an improved surface-covering cushion is provided having a smooth, atractive surface and greater strength and durability, and affording a means for laying carpet in a simpler and more expedient manner. In addition, a method for producing such cushions has been provided which avoids the disadvantages hereinbefore noted which are present when ordinary rubber-coated surface-covering cushions are produced.

While several embodiments of the invention have been shown, it will be understood, of course, that the invention is not limited thereto since many modifications may be made, and it is therefore contemplated by the appended claims to cover any such modifications as fall within the true spirit and scope of the invention.

The invention having thus been described, what is claimed and desired to be secured by Letters Patent is:

1. A cushion comprising a felted fiber resilient base and an impregnated wadding bonded to at least one surface of said base to form a smooth exterior surface of the cushion, the impregnant in said impregnated wadding including an elastomeric composition and being substantially evenly distributed throughout said wadding, said impregnant also being distributed throughout the fibers adjacent said surface of the base.

2. The structure of claim 1 wherein said wadding comprises paper.

3. The structure of claim 2 wherein said elastomeric composition is present in amounts ranging from about 1.5 to about 4 ounces per square yard of said base surface.

4. The structure of claim 2 wherein said elastomeric composition is present in the amount of about 2 ounces per square yard of said base surface.

5. The structure of claim 1 wherein the impregnated wadding has a predetermined design embossed thereon.

6. A cushion comprising a felted fiber resilient base and an impregnated wadding bonded to the planar surfaces of said base to form smooth exterior surfaces of the cushion, the impregnant in said impregnated wadding including an elastomeric composition and being substantially evenly distributed throughout said wadding, said impregnant also being distributed throughout the fibers adjacent said base surfaces.

7. The process for the manufacture of a cushion from a felted fiber resilient base, said process comprising applying an elastomeric composition to at least one surface of said base, said elastomeric composition impregnating the fibers of said base adjacent the surface thereof, applying a wadding on said base surface, applying pressure sufficient to integrate said composition and said wadding into a substantially homogeneous layer and to unite said layer with said base surface, and forming a smooth exterior surface of said cushion.

8. The process of claim 7 wherein said elastomeric composition is applied to said base while the latter is moving at a predetermined rate whereby only the fibers adjacent said base surfaces become impregnated with said composition.

9. The process of claim 7 wherein said elastomeric composition and said wadding are applied to two surfaces of said base.

10. The process for the manufacture of a cushion from a felted fiber resilient base: said process comprising applying an elastomeric composition to at least one surface of said base, said elastomeric composition impregnating the fibers of said base adjacent the surface thereof; applying a wadding on said base surface; embossing said base surface with said elastomeric composition and wadding superposed thereon sufficient to effect a predetermined design thereon, to integrate said composition and said wadding into a substantially homogenous layer and to unite said layer with said base surface; and forming a smooth exterior surface of said cushion.

11. The process for the manfuacture of a cushion from a felted fiber resilient base, said process comprising applying an elastomeric composition to at least one surface of said base, applying a wadding over said composition on said base surface, applying pressure sufficient to integrate said composition and said wadding into a substantially homogenous layer and to unite said layer with said base surface and forming a smooth exterior surface of said cushion.

12. The process for the manufacture of a cushion from a felted fiber resilient base, said process comprising applying a wadding to at least one surface of said base, applying an elastomeric composition over said wadding on said base surface, applying pressure sufficient to integrate said composition and said wadding into a substantially homogeneous layer and to unite said layer with said base and forming a smooth exterior surface of said cushion.

References Cited by the Examiner

UNITED STATES PATENTS

| 1,758,053 | 5/30 | Moses | 154—46 |
| 1,781,797 | 11/30 | Williams | 154—29 XR |
| 2,082,047 | 6/37 | Bronson | 161—123 |
| 2,572,470 | 10/51 | Gordon | 117—11 |
| 2,669,527 | 2/54 | Horwich. | |
| 2,856,323 | 10/58 | Gordon | 154—49 |
| 2,948,650 | 8/60 | Jackson et al. | 161—159 |

FOREIGN PATENTS 493,847   10/38   Great Britain.

EARL M. BERGERT, *Primary Examiner.*

CARL F. KRAFFT, *Examiner.*

UNITED STATES PATENT OFFICE
CERTIFICATE OF CORRECTION

Patent No. 3,179,551                               April 20, 1965

Rudolph F. Dudas

It is hereby certified that error appears in the above numbered patent requiring correction and that the said Letters Patent should read as corrected below.

Column 1, lines 40 and 41, for "necessitates" read -- necessitate --; column 2, line 57, for "rubber" read -- rubbery --; column 3, line 12, for "materials" read -- material --; line 31, after "with" insert -- the --; line 37, for "web", first occurrence, read -- wet --; same column 3, line 58, after "the" insert -- web --; column 4, line 31, for "atractive" read -- attractive --; column 5, line 11, for "surfaces" read -- surface --; line 17, for "base:" read -- base; --; same column 5, line 25, and column 6, line 3, for "homogenous", each occurrence, read -- homogeneous --; same column 6, line 21, for "161-123" read -- 154-49.2 --; line 22, for "117-11" read -- 154-49 XR --.

Signed and sealed this 14th day of September 1965.

(SEAL)
Attest:

ERNEST W. SWIDER                                   EDWARD J. BRENNER
Attesting Officer                                  Commissioner of Patents